United States Patent [19]
Luecke et al.

[11] Patent Number: 5,737,132
[45] Date of Patent: Apr. 7, 1998

[54] FLIP-TYPE MIRROR MOUNT

[75] Inventors: Francis S. Luecke, San Jose, Calif.; David M. Rines, Groton, Mass.

[73] Assignee: New Focus, Inc., Santa Clara, Calif.

[21] Appl. No.: 646,683

[22] Filed: May 6, 1996

[51] Int. Cl.⁶ .................................................. G02B 7/02
[52] U.S. Cl. ........................................ 359/819; 359/822
[58] Field of Search ................................ 359/819, 820, 359/823, 827, 892, 822, 811; 354/286; 362/455

[56] References Cited

U.S. PATENT DOCUMENTS

| | | | |
|---|---|---|---|
| 4,408,830 | 10/1983 | Wutherich | 359/819 |
| 4,927,237 | 5/1990 | Hart | 359/819 |
| 5,194,993 | 3/1993 | Bedzyk | 359/813 |
| 5,220,460 | 6/1993 | Bedzyk | 359/813 |
| 5,517,363 | 5/1996 | Suzuki | 359/819 |
| 5,526,192 | 6/1996 | Imura et al. | 359/813 |
| 5,530,547 | 6/1996 | Arnold | 356/354 |

*Primary Examiner*—David C. Nelms
*Assistant Examiner*—Ricky Mack
*Attorney, Agent, or Firm*—Hugh D. Jaeger

[57] ABSTRACT

Optical system mounting device having a tilting optical element holder which may be positioned in or out of a laser beam path. A pivot system of pivot balls adjustably located between a mirror holding element and a base provide a pivotal axis for the mirror holding element.

10 Claims, 12 Drawing Sheets

FLIP-TYPE MIRROR MOUNT

CROSS REFERENCES TO CO-PENDING APPLICATIONS

None.

BACKGROUND OF THE INVENTION

1. Field of the Invention

The present invention relates to mounting devices for optical systems, such as those constructed on an optical bench, and more particularly, to a flip mount which may be used to precisely position a mirror to either deflect a laser beam or allow it to pass.

2. Description of the Prior Art

In the field of experimental optics, it is customary to position the various optical elements on an optical bench which is quite commonly a massive block of rigid material supported by a shock absorbing mount. In the case where comparisons between systems are to be made, it is highly desirable that both systems be driven by the same laser source. The use of a single laser to feed several different systems may also be desirable for other reasons, such as the reduction in cost afforded by the use of one laser instead of two.

The switching from one system to another is best accomplished by the use of a mirror positioned in the optical path close to the laser source. The problem with using a removable mirror is that the mirror must be accurately positioned each time it is replaced in the optical path. The realignment of the mirror can be a time-consuming task since it must be very accurately positioned. Other approaches are possible, but the removable mirror represents the best solution despite its shortcomings.

SUMMARY OF THE INVENTION

The general purpose of the present invention is to provide an inexpensive, flip-type mirror mount that allows a mirror to be accurately repositioned to precisely deflect a laser beam into a new path. The mount includes a base member which is secured to the optical bench in the usual fashion. Pivotally mounted on the base member is an optical element holder to which a mirror is secured. The pivoting action is provided along an axis defined by first and second support balls or ball elements which ride in conical pockets in the optical element holder. One of the support balls rides in a conical pocket in the base member to provide an accurate fixed reference. The other support ball rides in a track which allows the optical element holder to position itself with reference to the first support ball. A tension spring is used to hold the optical element holder against the support balls. Placement of the tension spring provides bistable positioning and accommodates rotation of the holder on the axis defined by the support balls. Accurate positioning of the mirror is ensured by the use of a third support point, which may be a ball or a rounded extremity of an adjustment screw, either of which is carried by the movable holder and bears against the base member, to provide a three point suspension which is accurately reproducible.

Since the first support ball is accurately positioned by virtue of the conical pockets and the other two support points can accommodate usual tolerances without loss of position accuracy, the optical element holder can be precisely returned to the active position when it is desired to again deflect a laser beam along a first path.

It is one object of the present invention to provide a holder for an optical element, such as a mirror used to deflect a laser beam along an alternative path, which is easily used and is capable of precisely repositioning a mirror so as to eliminate the time-consuming alignment readjustment required with existing mirror holders.

Another object of the present invention is to provide a holder for an optical element, such as a mirror used to deflect a laser beam along an alternative path, which uses balls as the support elements to eliminate any play which would cause misalignment.

Still another object of the present invention is to provide a holder for an optical element, such as a mirror used to deflect a laser beam along an alternative path, in which a spring biases the optical element holder against support balls which provide a low friction pivot system which does not have any backlash.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
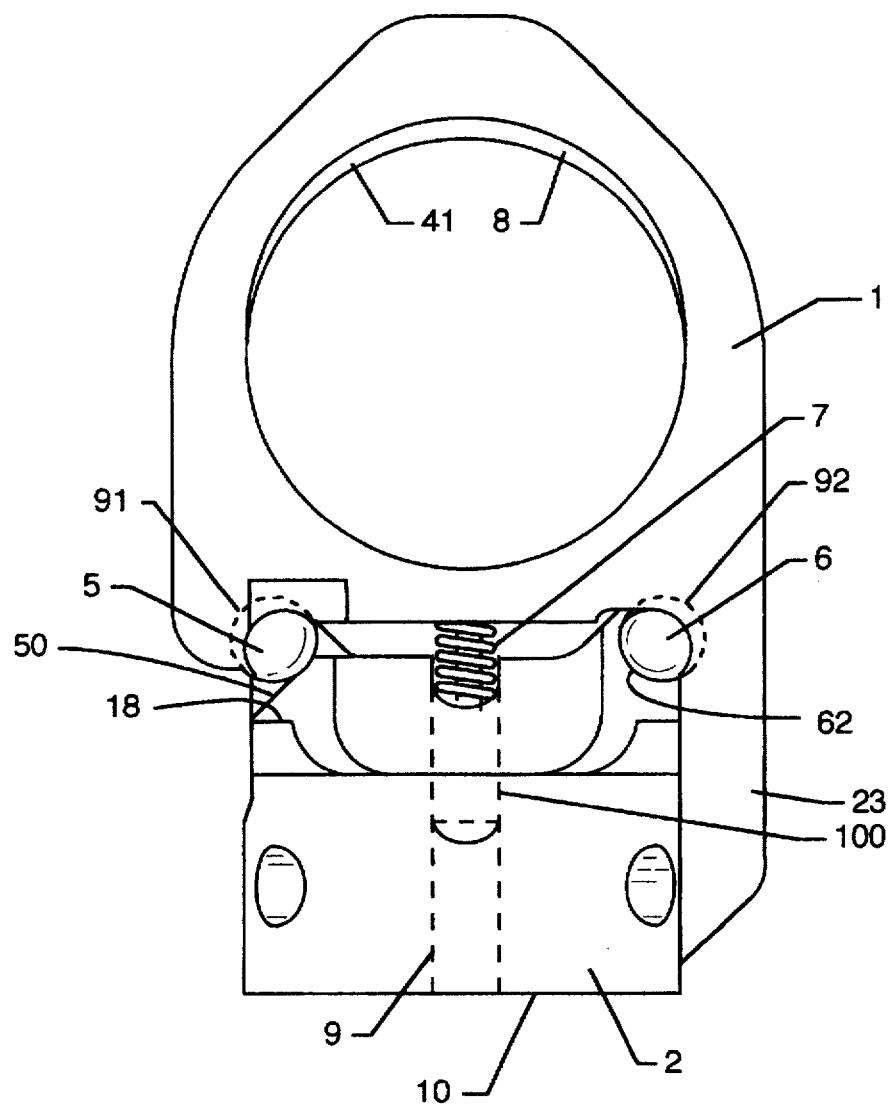
FIG. 1 illustrates a front view of the flip-type mirror mount of the present invention.

FIG. 1 illustrates a front view of a flip-type mirror mount comprising a movable mirror holding element or movable holder 1 supported by a base member 2 for rotational movement about the axis defined by first and second support balls or ball elements or ball members 5 and 6. A spring means such as tension spring 7, affixed at one end to mirror holding element 1 and at the other end to base member 2, holds the movable mirror holding element 1 against base member 2. An optical element mounting hole or retention means 8 accommodates an optical element, such as a front surface mirror, not shown. Base member 2 has an axial hole 9 projecting upwardly from the lower surface 10 to accommodate a mounting post or other similar element affixed to an optical bench, not shown.

Figure 2:
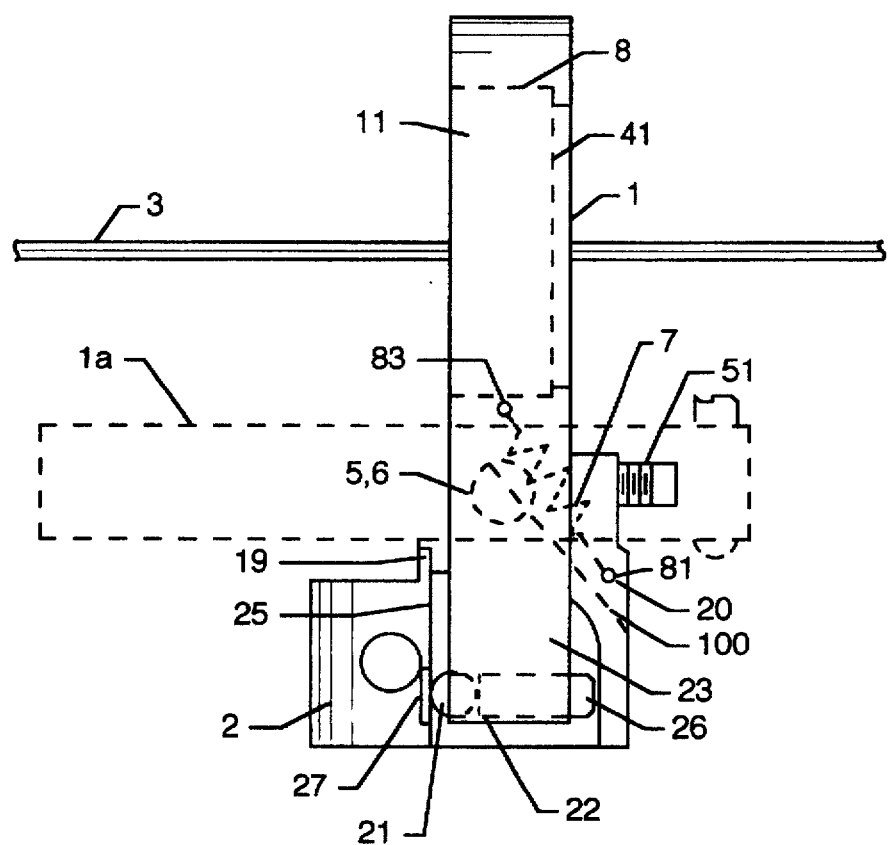
FIG. 2 illustrates a right side view of the flip-type mirror mount of this invention showing, in solid lines, the movable mirror holding element in the active position and, in dashed lines, the movable mirror holding element in the retracted position with the mirror out of the optical path.

FIG. 2 is a right side view of the flip-type mirror mount showing, in solid lines, the movable mirror holding element 1 in the first, or active position, with the optical element mounting hole 8 containing an optical element, such as a mirror, positioned where it will intercept a laser beam 3, where all numerals correspond to those elements previously described. In the first position, a third ball or ball element or ball member 21, bears against vertical limit surface 25 of base member 2. Vertical limit surface 25 may include an optional insert 27 of wear resistant, exceptionally hard material, such as sapphire. Ball element 21 is held in a retaining hole 22 located in an arm portion 23 forming part of the mirror holding element 1 and extending outwardly and downwardly from the pivot axis defined by ball elements 5 and 6. Retaining hole 22 has a narrowed capture end or ball retention shoulder 4 (shown in FIG. 5) and a threaded portion. A vertical alignment adjustment screw 26, which has a spherically-shaped end, is fitted into the threaded portion of the retaining hole 22 and provides means for adjusting the angular position of movable mirror holding element 1 in the active position. The spherically-shaped end of adjustment screw 26 can be an integral spherical end of the screw 26 itself or can be a separate ball attached, such as by bonding, to the inbound end of the screw 26. It will be appreciated that ball element 21 can be removed and the spherically-shaped end of adjustment screw 26 brought to bear directly against limit surface 25 or an insert, such as insert 27.

The dashed line showing of arm 1a represents the second, or inactive, position, wherein the optical element in hole 8 is moved out of the path of the laser beam.

Figure 3:
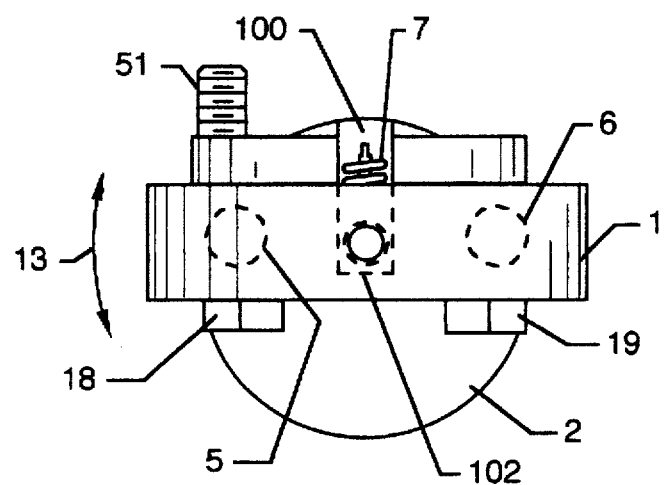
FIG. 3 illustrates a top view of the flip-type mirror mount of this invention.

FIG. 3 illustrates a top view of the flip-type mirror mount showing lateral alignment adjustment screw 51 which may be used to make a lateral adjustment of the mirror holding element 1, where all numerals correspond to those elements previously described. Rotation of lateral alignment adjustment screw 51 causes the mirror holding element 1 to rotate laterally about the vertical axis of ball 6, as indicated by arrow 13.

Figure 4:
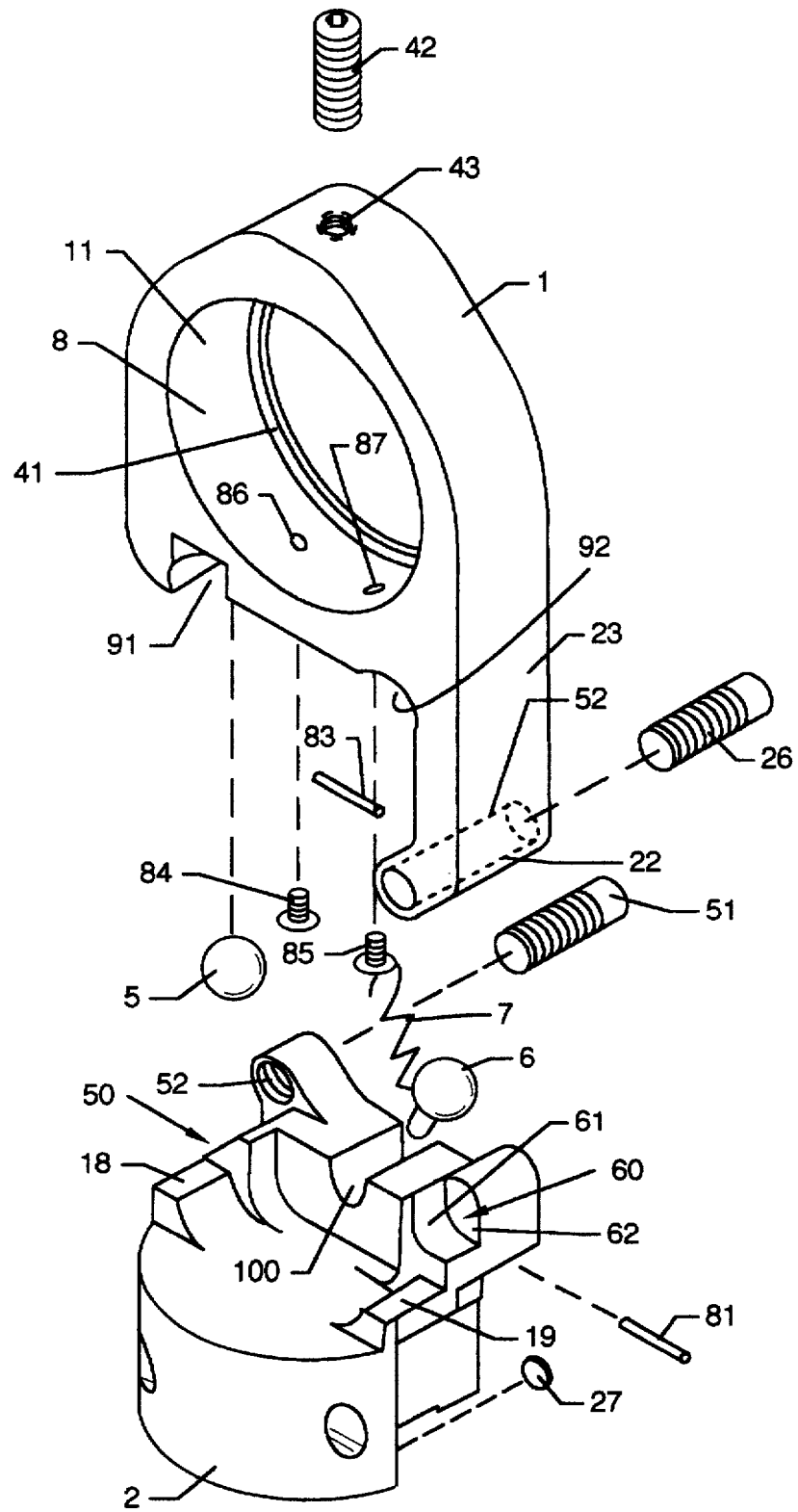
FIG. 4 illustrates an exploded isometric view of the flip-type mirror mount of this invention.

FIG. 4 illustrates an exploded isometric view of the flip-type mirror mount composed of the mirror holding element 1 and base member 2, where all numerals correspond to those elements previously described. FIG. 4 illustrates the optical element mounting hole 8 in the mirror holding element 1 provided with an interior shoulder 41, and further illustrates an optical element fixation screw 42 which passes through threaded hole 43 to secure an optical element in the optical element mounting hole 8 and against shoulder 41.

First and second support ball elements 5 and 6 are positioned in conical sockets or retention pockets, to be later described, in the lower region of movable mirror holding element 1. Support ball 5 rides against an inclined planar surface 50 and the end of lateral alignment adjustment screw 51, which passes through threaded hole 52 in the base member 2. Support ball 6 rides in a pocket 60 having a curved surface portion 61 and a planar surface portion 62.

Tension spring 7 is held in place at one end by spring retention pin 81, which is positioned in spring retention pin hole 20, shown in FIG. 2, in base member 2. The other end of tension spring 7 is held in place by spring retention pin 83 which is affixed to mirror holding element 1 by screws 84 and 85 which fit into threaded holes 86 and 87, respectively, shown extending vertically through the annular surface of the optical element mounting hole 8.

Stops or rest surfaces 18 and 19 formed of horizontal surfaces located on the upper region of the base member 2 are provided to limit rotational travel of the mirror holding element 1 about the pivot axis defined by support balls 5 and 6.

Figure 5:
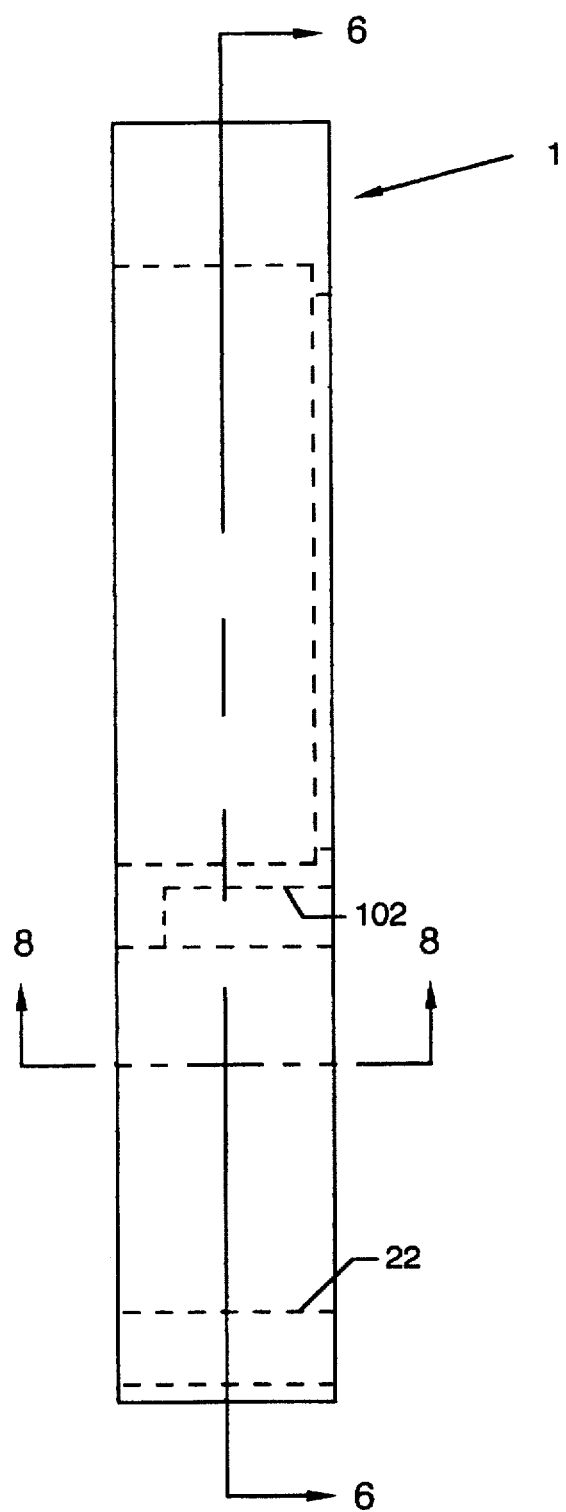
FIG. 5 illustrates a right side view of the movable mirror holding element.
Figure 6:
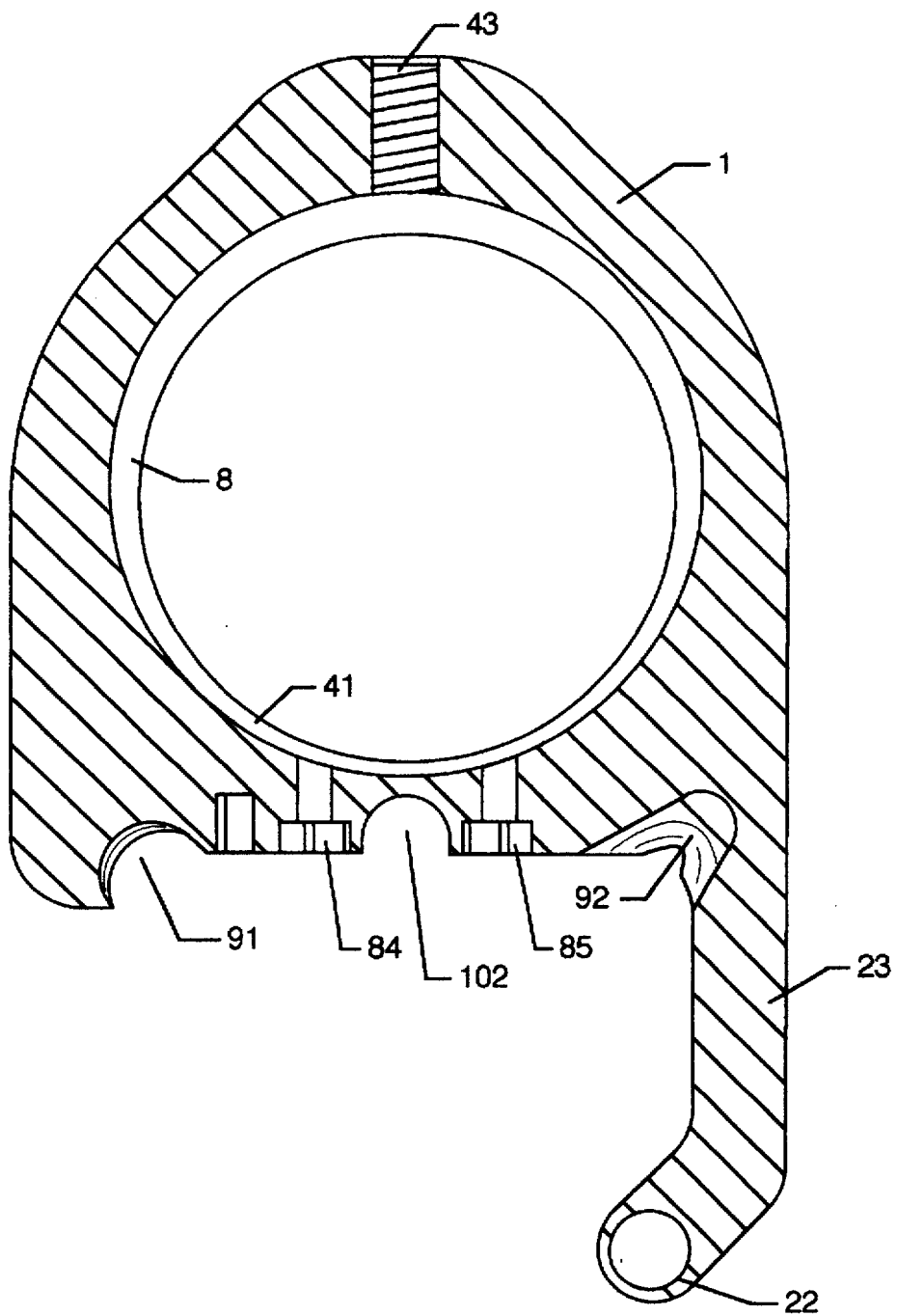
FIG. 6 illustrates a sectional view of the movable mirror holding element taken along the line 6—6 of FIG. 5.
Figure 8:
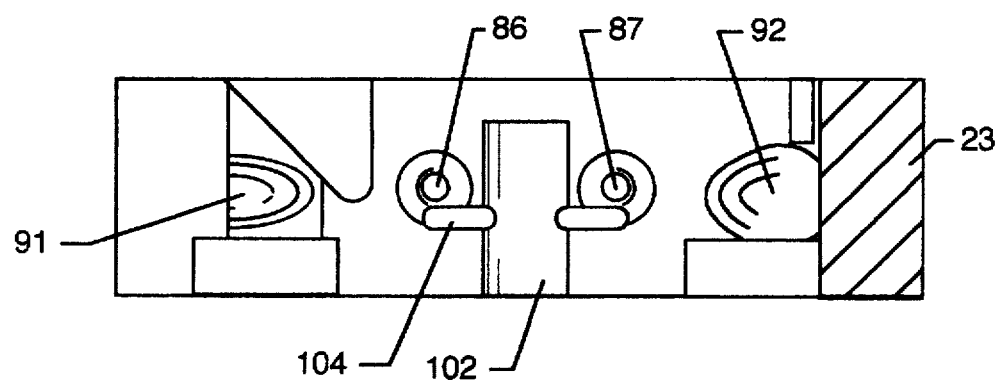
FIG. 8 illustrates a sectional view of the movable mirror holding element taken along the line 8—8 of FIG. 5.

FIG. 5 illustrates a right side view of the mirror holding element 1 and provides a reference for the sectional views of FIGS. 6 and 8. As mentioned earlier, this figure also shows the narrowed capture end or ball retention shoulder 4 of the retaining hole 22 in arm portion 23.

FIG. 6, a sectional view along line 6—6 of FIG. 5, illustrates the geometric configuration of the conical sockets or retention pockets 91 and 92 which accommodate ball elements 5 and 6, respectively. The conical shape of sockets 91 and 92, illustrated in FIGS. 6 and 7, ensures the precise alignment of ball elements 5 and 6.

Figure 7:
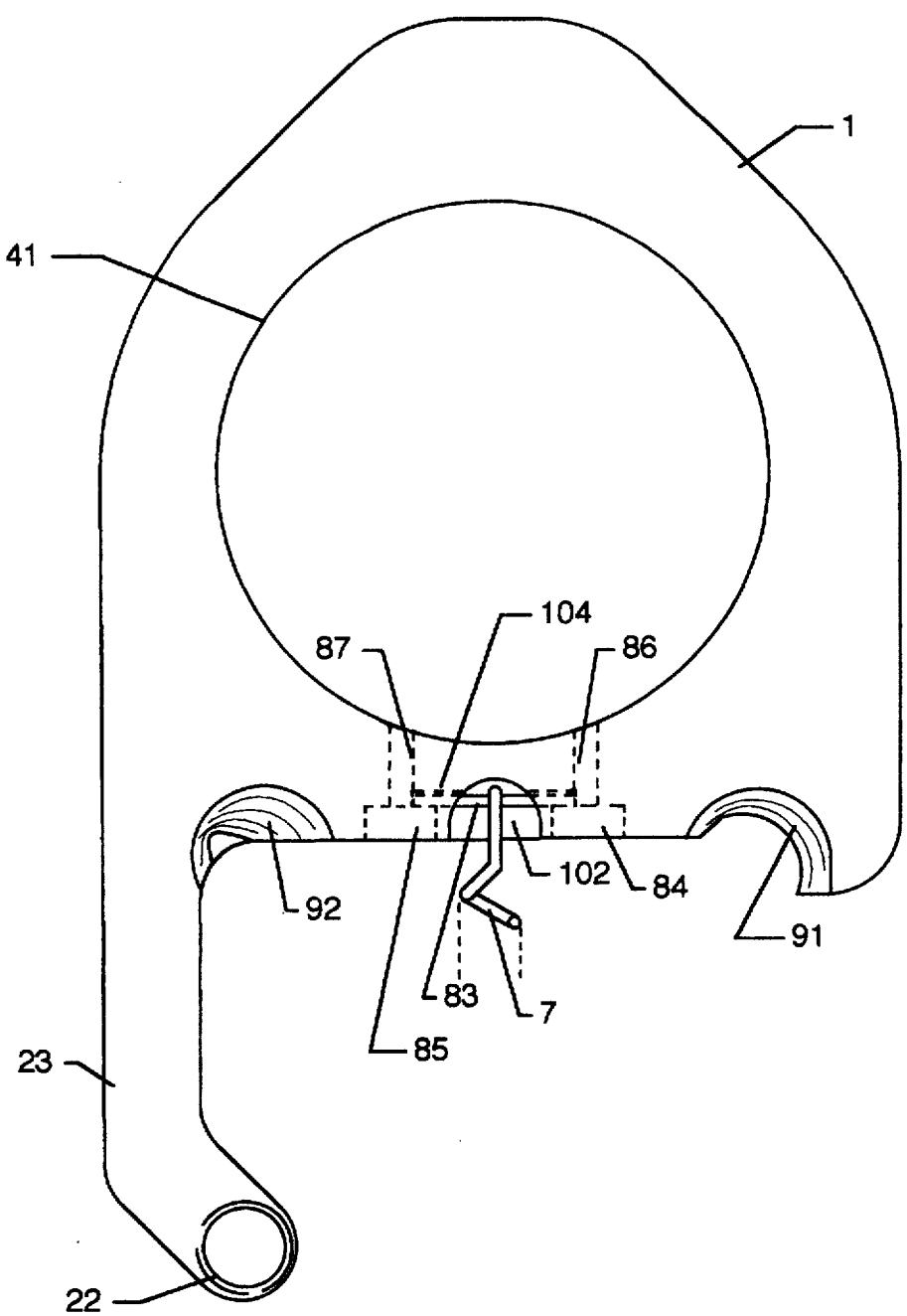
FIG. 7 illustrates the back of the movable mirror holding element.

FIG. 7 illustrates the back of the mirror holding element 1, where all numerals correspond to those elements previously described. Illustrated in particular are the conically shaped sockets or retention pockets 91 and 92 and an upper slot 102 which allows access for attachment of the upper portion of tension spring 7. Spring retention pin 83 is held in a transverse segmented channel 104 spanning the upper slot 102.

FIG. 8 illustrates a sectional view providing further insight into the shape of conical sockets 91 and 92 along line 8—8 of FIG. 5, where all numerals correspond to those elements previously described. The location of transverse segmented channel 104 for spring retention pin 83 is slightly displaced from the center of support balls 5 and 6 and conical sockets 91 and 92. Thus, the tension of spring 7 urges the mirror holding element 1 in the direction toward the end of lateral alignment adjustment screw 51 and planar surface portion 62, of FIG. 4, as well as in the direction downwardly toward inclined planar surface 50 and curved surface portion 61, when the mirror holding element 1 is in the first extended, or active, position. Rotation of the mirror holding element 1 to the second, inactive, position causes tension spring 7 to extend and pass the over centerposition and then retract, again urging the mirror holding element 1 against the same portions of base member 2 containing support balls 5 and 6, thereby providing two stable positions.

Figure 9:
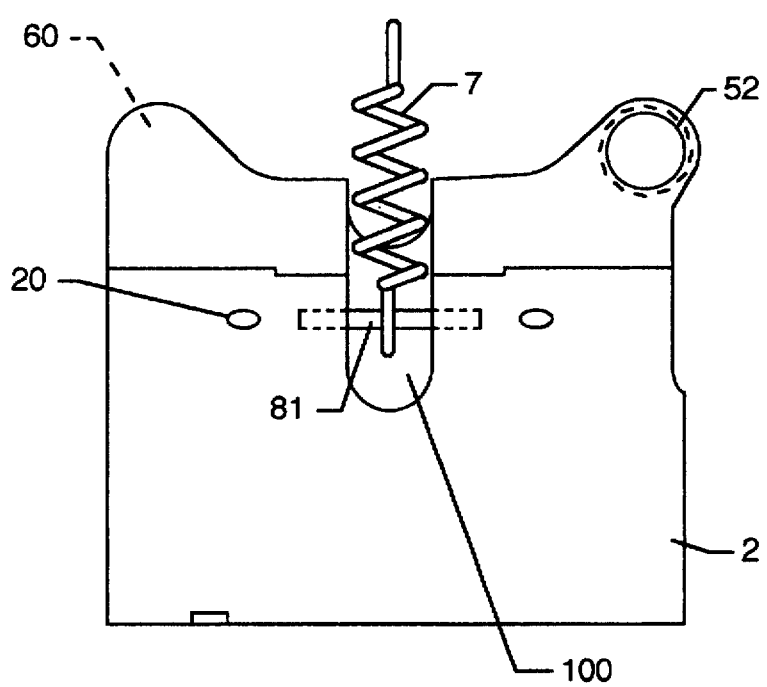
FIG. 9 illustrates a rear view of the base member.

FIG. 9 illustrates the rear side of the base member 2, where all numerals correspond to those elements previously described. Illustrated in particular is the location of tension spring 7 in the lower slotted area 100 and the connection of the lower end of tension spring 7 to the retention pin 81.

Figure 10:
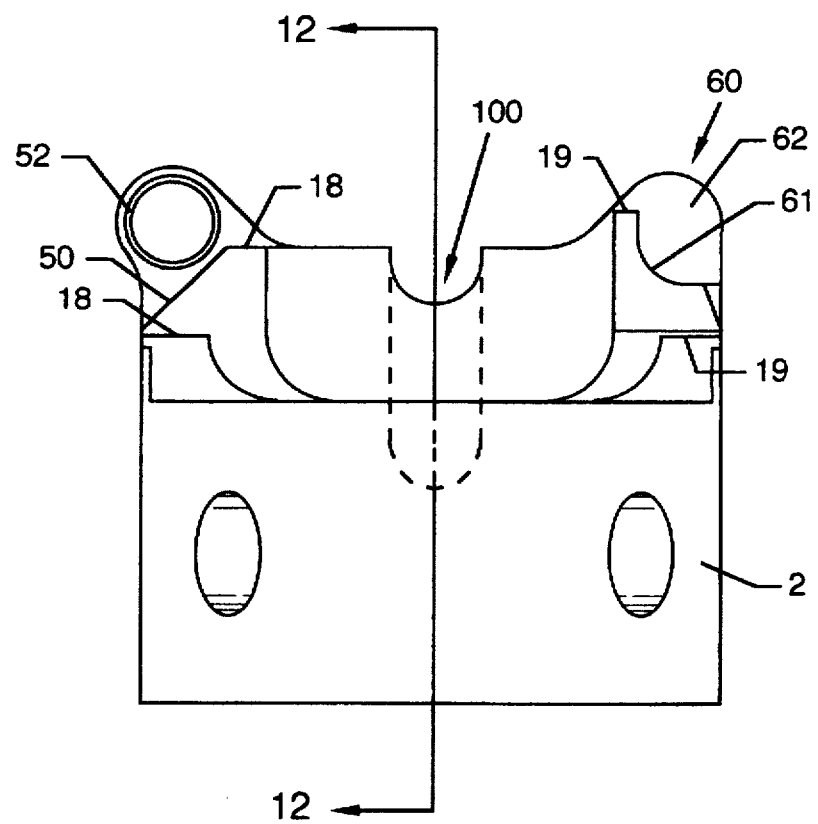
FIG. 10 illustrates a front view of the base member.

FIG. 10 illustrates a front view of the base member 2 showing the lower slotted area 100 for accommodating the lower end of tension spring 7, where all numerals correspond to those elements previously described. The relationship between inclined planar surface 50 for ball element 5 and the pocket 60 for ball element 6 is such that tension spring 7 simultaneously urges mirror holding element 1 against the curved surface portion 61 and the inclined planar surface 50, causing mirror holding element 1 to assume the same relative position each time it is moved to the first, upright and active, position.

Figure 11:
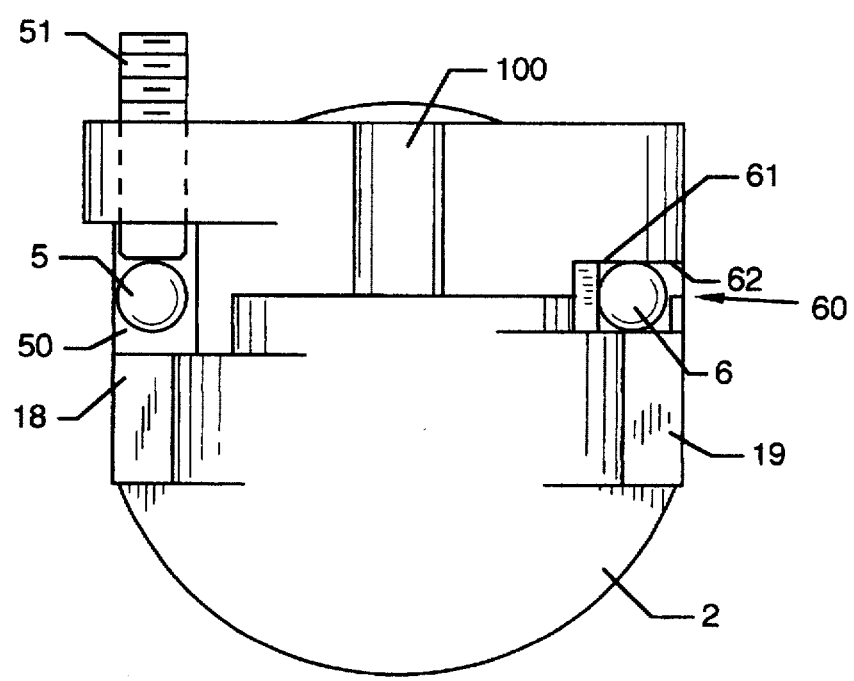
FIG. 11 illustrates a top view of the base member.

FIG. 11 illustrates a top view of the base member 2 and the relationship between the inclined planar surface 50 and pocket 60, where all numerals correspond to those elements previously described. It can be seen that the planar surface portion 62 of pocket 60 will engage ball element 6. Nominal alignment of ball element 5 is accomplished by advancing lateral alignment adjustment screw 51 until the end thereof is coplanar with planar surface portion 62.

Figure 12:
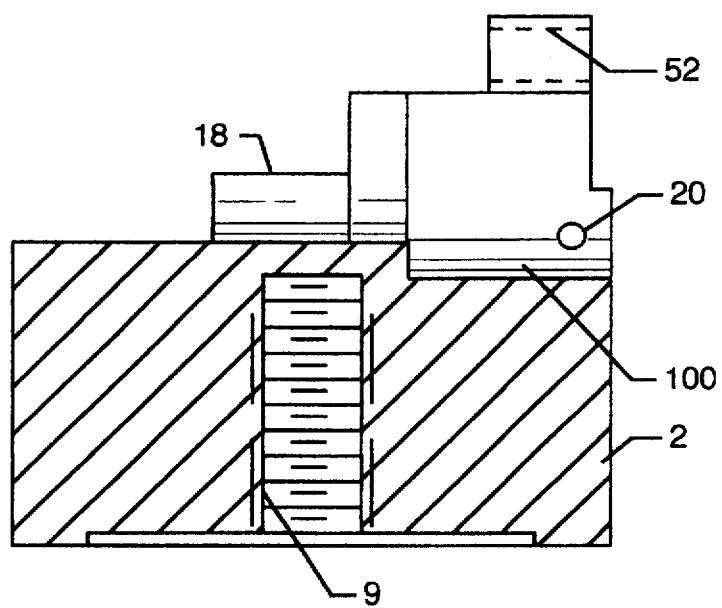
FIG. 12 illustrates a sectional view of the base member taken along the line 12—12 of FIG. 10.

FIG. 12 illustrates a sectional view of the base member 2 along line 12—12 of FIG. 10 and shows in particular the axial hole 9 which is used to affix the flip-type mirror mount to an optical bench.

It will be appreciated from the foregoing detailed description that lateral alignment adjustment screw 51 may be used to make a fine lateral alignment correction after the mirror holding element has been positioned, and vertical alignment adjustment screw 26 may be used to make a fine vertical alignment.

Various modifications can be made to the present invention without departing from the apparent scope hereof.

We claim:

1. A mount for positioning an optical element on an optical bench comprising:
   a. a movable holder having retention means for holding an optical element;
   b. said movable holder positionable to move an optical element between a first active position and a second inactive position;
   c. a base member fixedly mounted with respect to an optical system;
   d. first and second pivot ball members;
   e. said base member having first and second retention pockets for respective engagement with said first and second balls;
   f. said movable holder having first and second retention pockets for respective engagement with said first and second balls;
   g. each of said retention pockets having a conical surface portion which engages said balls;
   h. said movable holder having an arm portion extending outwardly from the pivot axis defined by said first and second balls;
   i. said base member having a limit surface;
   j. said arm portion having a third ball retained therein for abutting engagement with a limit surface of said base member; and,
   k. coil spring means positioned in the region between said first and second balls and being affixed to said movable holder and said base member at first and second points on opposite sides of the axis of rotation defined by said first and second balls whereby said spring member is in tension when said movable holder is in said first position to hold said movable element against the first and second balls and force said third ball against said limit surface, said spring member extend to accommodate rotational movement of said movable holder between said first and second positions, said spring member being further in tension in said second position to retain said holder in engagement with said first and second balls and a rest surface of said base member.

2. A mount according to claim 1, wherein said first position of said movable holder is in the range of 90 degrees from said second position.

3. A mount according to claim 1, wherein said arm portion of said movable holder is positioned outwardly from said first and second ball members.

4. A mount according to claim 3, wherein said arm portion has a hole extending therethrough for the retention of said third ball member.

5. A mount according to claim 4, wherein said hole includes a third ball retention shoulder portion projecting inwardly and having an interior diameter less than the diameter of said third ball.

6. A mount according to claim 5, wherein said hole has a threaded portion and adjustment screw at the end opposite said shoulder portion.

7. A mount according to claim 6, wherein said adjustment screw has a length which can rotate said mount by positioning said third ball through a range where said ball projects from said arm but does not bear against said retention shoulder.

8. A mount according to claim 7, wherein said range includes the point where an optical element in said movable holder is positioned at 90 degrees with respect to said optical bench.

9. A mount according to claim 1, wherein said first, second and third ball members are of a material harder than the material of said base member and said arm member.

10. A mount according to claim 9, wherein said base member and said arm member are of aluminum and said first, second and third ball members are of steel.

* * * * *